United States Patent
Chen

(10) Patent No.: US 10,204,067 B2
(45) Date of Patent: Feb. 12, 2019

(54) DATA TRANSFER DEVICE OF DISPLAY EQUIPMENT AND DATA TRANSFER METHOD

(71) Applicant: Wistron Corporation, New Taipei (TW)

(72) Inventor: Feng-Yuan Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 241 days.

(21) Appl. No.: 15/058,122

(22) Filed: Mar. 1, 2016

(65) Prior Publication Data

US 2017/0124009 A1     May 4, 2017

(30) Foreign Application Priority Data

Oct. 28, 2015   (TW) .............................. 104135415 A

(51) Int. Cl.
| | |
|---|---|
| *G06F 13/38* | (2006.01) |
| *G06F 9/4401* | (2018.01) |
| *G06F 13/10* | (2006.01) |
| *G06F 13/40* | (2006.01) |
| *G06F 13/42* | (2006.01) |

(52) U.S. Cl.
CPC .......... *G06F 13/385* (2013.01); *G06F 9/4411* (2013.01); *G06F 13/102* (2013.01); *G06F 13/4022* (2013.01); *G06F 13/4282* (2013.01)

(58) Field of Classification Search
CPC .. G06F 13/385; G06F 13/102; G06F 13/4022; G06F 13/4282; G06F 9/4411
See application file for complete search history.

(56) References Cited

U.S. PATENT DOCUMENTS

| | | | |
|---|---|---|---|
| 6,532,512 B1* | 3/2003 | Torii | ................... G06F 13/4022 |
| | | | 710/316 |
| 2006/0036885 A1* | 2/2006 | Hsieh | ................... G06F 1/1601 |
| | | | 713/300 |

(Continued)

FOREIGN PATENT DOCUMENTS

| | | |
|---|---|---|
| CN | 1164703 | 11/1997 |
| TW | 201351159 | 12/2013 |
| TW | 201502796 | 1/2015 |

OTHER PUBLICATIONS

"Office Action of Taiwan Counterpart Application" with partial English translation, dated Apr. 8, 2016, p. 1-15.

*Primary Examiner* — Nimesh G Patel
(74) *Attorney, Agent, or Firm* — JCIPRNET

(57) ABSTRACT

A data transfer device of a display equipment and a data transfer method are provided. The data transfer device of the display equipment includes a display panel, a first transfer connector, a second transfer connector, a configuration switch and a control unit. The first and the second transfer connector are in line with a universal serial bus (USB) protocol including a plurality of data paths. When a first electronic device is connected to the first transfer connector, the control unit separates the data paths of the first transfer connector into at least one video data path and at least one data-transferring data path dynamically. A video signal of the first electronic device is transferred to the display panel through the video data path, and the first electronic device and the second electronic device transfer data to each other through the data-transferring data path.

10 Claims, 3 Drawing Sheets

(56) References Cited

U.S. PATENT DOCUMENTS

| | | | |
|---|---|---|---|
| 2013/0332556 A1* | 12/2013 | Chen | H04L 47/10 709/208 |
| 2014/0098003 A1* | 4/2014 | Chien | G06F 13/00 345/1.1 |
| 2014/0156873 A1* | 6/2014 | Koara | G06F 9/4411 710/13 |
| 2016/0125838 A1* | 5/2016 | Hundal | G09G 5/006 345/520 |

* cited by examiner

DATA TRANSFER DEVICE OF DISPLAY EQUIPMENT AND DATA TRANSFER METHOD

CROSS-REFERENCE TO RELATED APPLICATION

This application claims the priority benefit of Taiwan application serial no. 104135415, filed on Oct. 28, 2015. The entirety of the above-mentioned patent application is hereby incorporated by reference herein and made a part of this specification.

BACKGROUND OF THE INVENTION

Field of the Invention

The invention relates to a data transfer technique, and particularly relates to a data transfer device of a display equipment and a data transfer method thereof.

Description of Related Art

Along with development of technology, various mobile devices (for example, mobile phones, tablet personal computers (PCs), notebooks, etc.) gradually become popular. A transfer interface configured on the mobile device is expected to have a variety of uses, for example, it is expected to synchronously transfer data, video and power through a same data transfer interface. Presently, a universal serial bus (USB) interface has developed to a USB TYPE-C interface, which may implement synchronously transferring video, data and power through one cable.

On the other hand, when a large-scale screen device (for example, a large television screen or a projection device) is used, the user generally wants to play a video of the mobile device through the large-scale screen device, so as to enjoy a better sound and light effect. However, if the large-scale screen device supports the USB TYPE-C interface, the mobile device generally only transfers the video to the large-scale screen device though the USB TYPE-C interface in a high speed without preserving a bandwidth in the USB TYPE-C interface for data transfer. Particularly, under a current situation that the adopted video quality has reached a resolution of 4K, the high speed communication in the USB TYPE-C interface is required to use all of data paths for the use of video transfer in order to keep a smooth video playing.

Therefore, if the mobile device wants to additionally transfer data through the data transfer interface while using the large-scale screen device to display video through, extra hardware equipment or communication interface is generally required for implementation.

SUMMARY OF THE INVENTION

The invention is directed to a data transfer device of a display equipment and a data transfer method thereof, in which a function of a universal serial bus (USB) hub is integrated in the display equipment, and an electronic device is adapted to transmit a video signal to the display equipment through a transfer connector of the USB, and is adapted to exchange information with other electronic devices connected to the display equipment.

The invention provides a data transfer device of a display equipment including a display panel, a first transfer connector, a second transfer connector, a configuration switch and a control unit. The first transfer connector and the second transfer connector are in line with a universal serial bus (USB) protocol including a plurality of data paths. The configuration switch is configured to adjust a transfer direction of the data paths in the first transfer connector and the second transfer connector. The control unit is coupled to the configuration switch and the display panel. When a first electronic device is connected to the first transfer connector, the control unit controls the configuration switch to dynamically separate the data paths of the first transfer connector into at least one video data path and at least one data-transferring data path. A video signal of the first electronic device is transferred to the display panel through the video data paths, and the first electronic device mutually transfers data with the second electronic device connected to the second transfer connector through the data-transferring data paths.

In an embodiment of the invention, when the second transfer connector of the data transfer device is not connected to the second electronic device or the second electronic device does not mutually transfer data with the first electronic device, the control unit controls the configuration switch to take all of the data paths of the first transfer connector as the video data paths.

In an embodiment of the invention, when the second transfer connector of the data transfer device is connected to the second electronic device and the second electronic device wants to mutually transfer data with the first electronic device, the control unit controls the configuration switch to separate a part of the data paths of the first transfer connector into the video data paths and separate the other part of the data paths into the data-transferring data paths.

In an embodiment of the invention, the number of the data paths is 4. When the second transfer connector of the data transfer device is connected to the second electronic device and the second electronic device wants to mutually transfer data with the first electronic device, the control unit controls the configuration switch to separate two of the data paths of the first transfer connector into the video data paths and separate the other two of the data paths into the data-transferring data paths. Moreover, the control unit adjusts a display setting value of the display panel to decrease a data transfer amount of the video signal output by the first electronic device.

In an embodiment of the invention, the control unit is a scaler of the display panel. The USB protocol is a USB TYPE-C interface.

In an embodiment of the invention, the data transfer device further includes a communication interface connector, which is in line with a network communication protocol. The control unit acquires a video source for displaying on the display panel from a network through the communication interface connector.

The invention provides a data transfer method adapted to a display equipment having a first transfer connector and a second transfer connector. The data transfer method includes following steps. It is determined whether an electronic device is connected to the first transfer connector and the second transfer connector, where the first transfer connector and the second transfer connector are in line with a USB protocol including a plurality of data paths. When the electronic device is connected to the first transfer connector, the data paths of the first transfer connector are dynamically separated into at least one video data path and at least one data-transferring data path. A video signal of the electronic device is transferred to the display panel through the video data paths, and the electronic device mutually transfers data with another electronic device connected to the second transfer connector through the data-transferring data paths.

According to the aforementioned description, the embodiment of the invention integrates the function of the USB hub into the display equipment, such that the display equipment is capable of connecting the electronic devices through a plurality of USB transfer connectors disposed thereon. Besides that the electronic device may transfer the video signal to the display equipment through the transfer connectors for displaying, the electronic device may also mutually transfer data with other electronic device connected to the display equipment, so as to diversify the functions of the display equipment. On the other hand, since when the electronic device mutually transfers data with the other electronic device, a bandwidth for transferring the video signal is slightly decreased, in the embodiment of the invention, the display setting value of the display panel is automatically adjusted to decrease a data transfer amount of the video signal output by the electronic device, such that the electronic device of the user may also transfer data to other electronic device while acquiring basic video quality.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
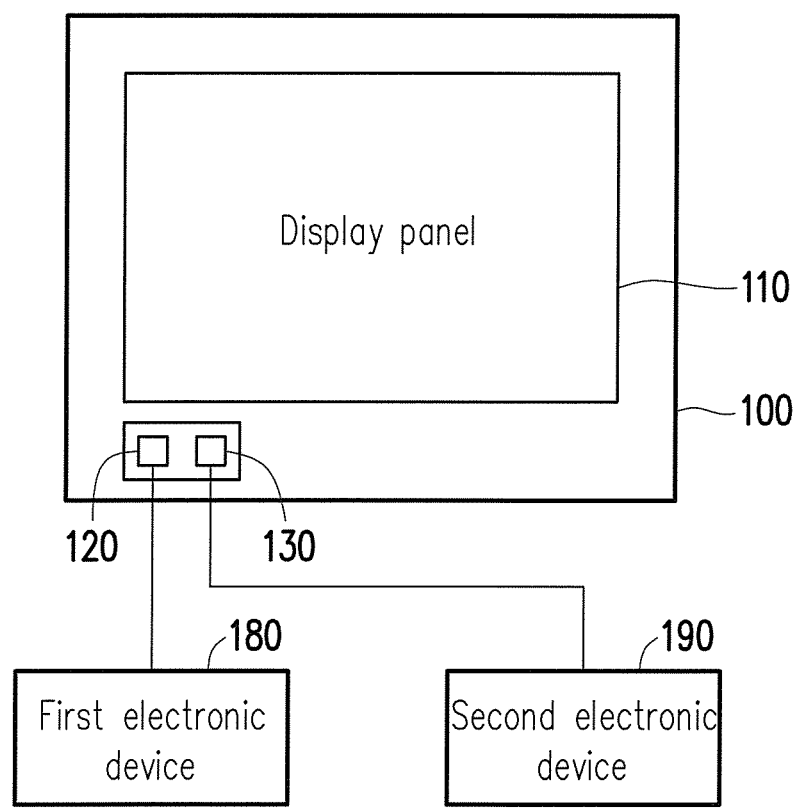
FIG. 1 is a schematic diagram of a data transfer device of a display equipment according to an embodiment of the invention.
Figure 2:
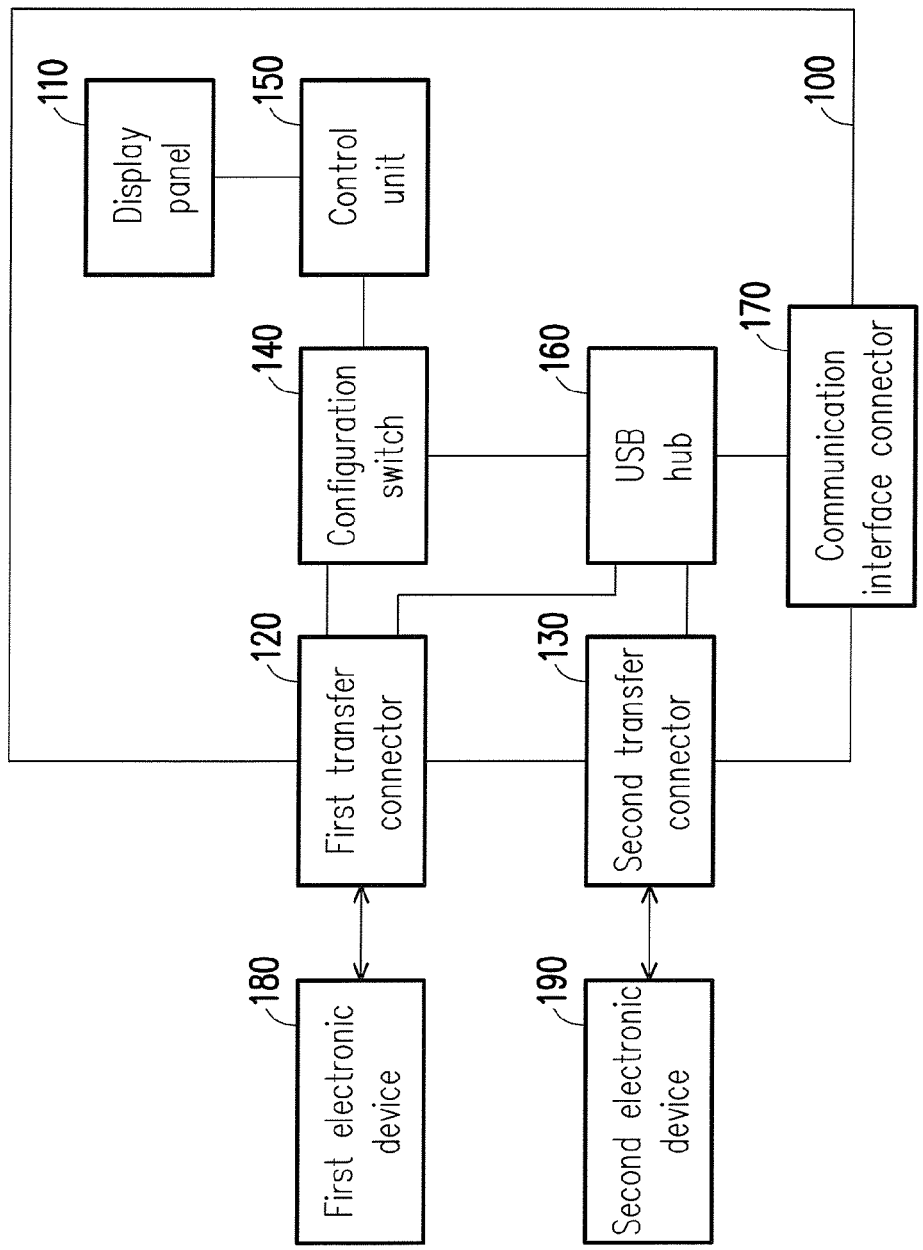
FIG. 2 is a block diagram of a data transfer device of the display equipment according to an embodiment of the invention.

FIG. 1 is a schematic diagram of a data transfer device 100 of a display equipment according to an embodiment of the invention. FIG. 2 is a block diagram of the data transfer device 100 of the display equipment according to an embodiment of the invention. Referring to FIG. 1, the data transfer device 100 of a display equipment mainly includes a display panel 110, a first transfer connector 120, a second transfer connector 130, a configuration switch 140 and a control unit 150. The data transfer device 100 can be disposed in the display equipment, so that the data transfer device 100 may have the display panel 110. The display panel 110 can be a liquid crystal display screen, a light-emitting diode (LED) display screen, an organic LED display screen, a projective display screen, etc. In other words, the display equipment is originally configured with some connection ports or transfer connection holes used for inputting video, and in the present embodiment, the connection ports or the transfer connection holes are integrated with a hub function to implement the embodiment of the invention.

The first transfer connector 120 and the second transfer connector 130 are in line with a universal serial bus (USB) protocol including a plurality of data paths. The first transfer connector 120 and the second transfer connector 130 of the present embodiment are in line with a USB TYPE-C interface, and the USB 3.1 TYPE-C interface includes four high-speed data paths. Those skilled in the art may apply different data transfer interfaces to the embodiment of the invention as long as the data transfer interface may simultaneously transfer a video and data, and the data transfer interface have two or more than two data paths. In other embodiments, the data transfer device 100 may have more than two transfer connectors, or have a different type of the USB interface, for example, a USB TYPE-A connector. Moreover, besides that the first transfer connector 120 and the second transfer connector 130 have a plurality of high-speed data paths, the first transfer connector 120 and the second transfer connector 130 also have a fixed data transfer path included in the original USB 2.0 interface, i.e. a D+ and D− transfer path used by a general USB signal.

The configuration switch 140 is configured to adjust a transfer direction of the high-speed data paths in the first transfer connector 120 and the second transfer connector 130. In detail, the configuration switch 140 is controlled by the control unit 150. The configuration switch 140 may connect a part of or all of the data paths in the first transfer connector 120 to the display panel 110 under control of the control unit 150, such that a first electronic device 180 connected to the first transfer connector 120 may display a video signal on the display panel 110. The configuration switch 140 may also connect a part of or all of the data paths in the first transfer connector 120 to a part of the data paths in the second transfer connector 130, such that the first electronic device 180 connected to the first transfer connector 120 and a second electronic device 190 connected to the second transfer connector 130 may transfer data to each other. The control unit 150 can be a scaler in the display equipment, or can be a special chip or firmware used for implementing the embodiment of the invention.

The data transfer device 100 of the display equipment may further include a USB hub 160 and a communication interface connector 170. The USB hub 160 is coupled to the first transfer connector 120 and the second transfer connector 130 for respectively detecting whether the first transfer connector 120 or the second transfer connector 130 is connected to the first electronic device 180 or the second electronic device 190. On the other hand, the USB hub 160 has to be used to implement the mutual data transfer between the first electronic device 180 connected to the first transfer connector 120 and the second electronic device 190 connected to the second transfer connector 130. The communication interface connector 170 can be a RS232 socket, which is in line with a network communication protocol. The control unit 150 acquires a video source for displaying on the display panel 110 from a network through the communication interface connector 170.

Referring to FIG. 1 and FIG. 2, when the first electronic device 180 is connected to the first transfer connector 120, the control unit 150 may control the configuration switch 140 to dynamically determine whether to separate the data paths in the first transfer connector 120 into at least one video data path and at least one data-transferring data path. If now the second transfer connector 130 is not connected to the other electronic device, and the first electronic device 180 wants to display the video signal through the display panel 110, since there is not data transfer demand, the control unit 150 controls the configuration switch 140 to take all of the four data paths in the first transfer connector 120 as the video data paths, such that the video signal of the first electronic device 180 may acquire the maximum bandwidth, so as to achieve optimal video viewing quality.

If now the second transfer connector 130 is connected to the second electronic device 190, and the second electronic device 190 wants to mutually transfer data with the first electronic device 180, the control unit 150 controls the configuration switch 140 to separate a part of the four data paths (for example, two of the four data paths) in the first transfer connector 120 into the video data paths, and separate another part of the four data paths (for example, the other two of the four data paths) into the data-transferring data paths. The video signal of the first electronic device 180 is transferred to the display panel 110 through the aforementioned video data paths and the control unit 150 for displaying. On the other hand, the first electronic device 180 may also mutually transfer data with the second electronic device 190 connected to the second transfer connector 130 through the aforementioned data-transfer data paths and the USB hub 16. In other words, besides that the first electronic device 180 may transfer the video signal to the display panel 110 of the display equipment through the transfer connectors 120 and 130 for displaying, the first electronic device 180 may also mutually transfer data with the second electronic device 190 connected to the display equipment, so as to expand the function of the display equipment.

In the present embodiment, if the first electronic device 180 and/or the second electronic device 180 connected to the first transfer connector 120 and the second transfer connector 130 are not required to use or support the high-speed data path, the D+ and D− transfer paths with a lower transfer speed in the first transfer connector 120 and/or the second transfer connector 130 can be adopted to mutually transfer data. In other words, based on the D+ and D− transfer paths with the lower transfer speed, the first electronic device 180 and/or the second electronic device 190 may transfer data to each other through the first transfer connector 120 and/or the second transfer connector 130 in a low-speed state.

It should be noted that if the first electronic device 180 originally adopts the four high-speed data paths to transfer the video signal of 4K quality that requires a higher bandwidth, and then two data paths are occupied for mutually transferring data with the second electric device 190, the video signal is only transferred through the other two data paths, in this case, when the video signal of the 4K quality is only transferred through the two data paths, a severe video delay, a poor video quality, etc. are probably occurred. Therefore, the control unit 150 in the data transfer device 100 may communicates with the first electronic device 180 to decrease the quality of the video signal transferred by the first electronic device 180 (for example, to use the video signal with originally quality), or decrease an amount of frames per second, and the control unit 150 may also automatically adjust a display setting value of the display panel 110, such that the electronic device of the user may transfer data to other electronic device while acquiring basic video quality. The so-called "display setting value" can be extended display identification data (EDID) or can be display port configuration data (DPCD).

Figure 3:
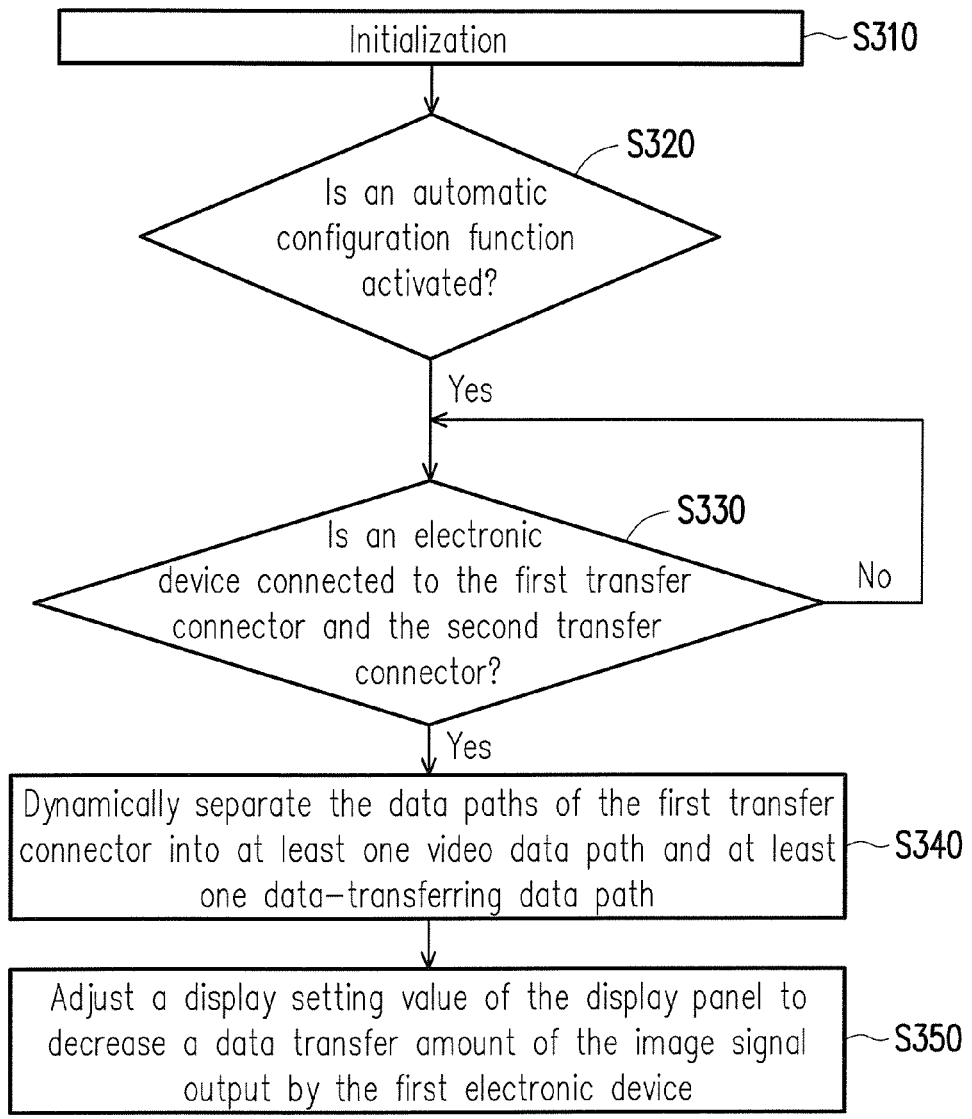
FIG. 3 is a flowchart illustrating a data transfer method of the display equipment according to an embodiment of the invention.

FIG. 3 is a flowchart illustrating a data transfer method of a display equipment according to an embodiment of the invention. Referring to FIG. 2 and FIG. 3, in step S310, the control unit 150 in the data transfer device 100 performs initialization, and controls the configuration switch 140 to preliminarily take all of the four data paths in the first transfer connector 120 as the video data paths. In step S320, the control unit 150 determines whether the function (which is referred to as an automatic configuration function) mentioned in the embodiment of the invention is activated. If the automatic configuration function is activated, a step S330 is executed, by which the control unit 150 determines whether an electronic device is connected to the first transfer connector 120 and the second transfer connector 130 through the USB hub 160.

When the first electronic device 180 and the second electronic device 190 are respectively connected to the first transfer connector 120 and the second transfer connector 130, and the first transfer connector 120 and the second transfer connector 130 want to transfer data to each other, a step S340 is executed, by which the control unit 150 dynamically separates the four data paths in the first transfer connector 120 into at least one video data path and at least one data-transferring data path. In the present embodiment, the control unit 150 takes two of the four data paths in the first transfer connector 120 as the video data paths, and takes the other two of the four data paths in the first transfer connector 120 as the data-transferring data paths. In other embodiment, a ratio between the video data paths and the data-transferring data paths can be adjusted according to an actual requirement, for example, adjusted to 1:3, 2:2 or 3:1. In step S350, the control unit may adjust a display setting value of the display panel 110, so as to decrease a data transfer amount of the video signal output by the first electronic device 180.

In summary, the embodiment of the invention integrates the function of the USB hub into the display equipment, such that the display equipment is capable of connecting the electronic devices through a plurality of USB transfer connectors disposed thereon. Besides that the electronic device may transfer the video signal to the display equipment through the transfer connectors for displaying, the electronic device may also mutually transfer data with other electronic device connected to the display equipment, so as to diversify the functions of the display equipment. On the other hand, when the electronic device mutually transfers data with the other electronic device, since a bandwidth used for transferring the video signal is slightly decreased, in the embodiment of the invention, the display setting value of the display panel is automatically adjusted to decrease a data transfer amount of the video signal output by the electronic device, such that the electronic device of the user may also transfer data to other electronic device while acquiring basic video quality.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A data transfer device of a display equipment, comprising:
   a display panel;
   a first transfer connector and a second transfer connector, wherein the first transfer connector and the second transfer connector are in line with a universal serial bus protocol comprising a plurality of data paths;
   a configuration switch, configured to adjust a transfer direction of the data paths in the first transfer connector and the second transfer connector; and
   a control unit, coupled to the configuration switch and the display panel,
   wherein in response to a first electronic device is connected to the first transfer connector, the control unit controls the configuration switch to dynamically sepa- rate the data paths of the first transfer connector into a video data path and a data-transferring data path, wherein a video signal of the first electronic device is transferred to the display panel through the video data path, and the first electronic device mutually transfers data with a second electronic device connected to the second transfer connector through the data-transferring data path, wherein when there is no data transfer in demand, the control unit controls the configuration switch to take all of the data paths of the first transfer connector as the video data paths.

2. The data transfer device as claimed in claim 1, wherein no data transfer demand means that the second transfer connector of the data transfer device is not connected to the second electronic device or the second electronic device does not mutually transfer data with the first electronic device.

3. The data transfer device as claimed in claim 1, wherein when the second transfer connector of the data transfer device is connected to the second electronic device and the second electronic device wants to mutually transfer data with the first electronic device, the control unit controls the configuration switch to separate a part of the data paths of the first transfer connector into the video data path and separate the other part of the data paths into the data-transferring data path.

4. The data transfer device as claimed in claim 3, wherein the number of the data paths is 4, when the second transfer connector of the data transfer device is connected to the second electronic device and the second electronic device wants to mutually transfer data with the first electronic device, the control unit controls the configuration switch to separate two of the data paths of the first transfer connector into the video data paths and separate the other two of the data paths into the data-transferring data paths, and the control unit adjusts a display setting value of the display panel to decrease a data transfer amount of the video signal output by the first electronic device.

5. The data transfer device as claimed in claim 1, wherein the control unit is a scaler of the display panel.

6. The data transfer device as claimed in claim 1, wherein the universal serial bus protocol is a universal serial bus TYPE-C interface.

7. The data transfer device as claimed in claim 1, further comprising:

a communication interface connector, being in line with a network communication protocol, wherein the control unit acquires a video source for displaying on the display panel from a network through the communication interface connector.

8. A data transfer method, adapted to a display equipment having a first transfer connector and a second transfer connector, comprising:

determining whether an electronic device is connected to the first transfer connector and the second transfer connector, wherein the first transfer connector and the second transfer connector are in line with a universal serial bus protocol comprising a plurality of data paths; and dynamically separating the data paths of the first transfer connector into a video data path and a data-transferring data path in response to the electronic device is connected to the first transfer connector, wherein a video signal of the electronic device is transferred to the display panel through the video data path, and the electronic device mutually transfers data with another electronic device connected to the second transfer connector through the data-transferring data path, wherein when there is no data transfer in demand, taking all of the data paths of the first transfer connector as the video data paths.

9. The data transfer method as claimed in claim 8, wherein no data transfer demand means that the second transfer connector of the data transfer device is not connected to the second electronic device.

10. The data transfer method as claimed in claim 8, wherein the step of dynamically separating the data paths of the first transfer connector into the video data path and the data-transferring data path comprises:

separating a part of the data paths of the first transfer connector into the video data path and separating the other part of the data paths into the data-transferring data path when the second transfer connector of the data transfer device is connected to another electronic device and the another electronic device wants to mutually transfer data with the first electronic device; and adjusting a display setting value of the display panel to decrease a data transfer amount of the video signal output by the electronic device.

* * * * *